(12) United States Patent  
Bernard et al.

(10) Patent No.: US 9,806,845 B1  
(45) Date of Patent: Oct. 31, 2017

(54) MITIGATING SPECTRAL EXCURSIONS IN PASSIVE OPTICAL NETWORKS

(71) Applicant: Calix, Inc., Petaluma, CA (US)

(72) Inventors: Christopher Thomas Bernard, Wayzata, MN (US); Harold Ashton Roberts, Excelsior, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 15/251,084

(22) Filed: Aug. 30, 2016

(51) Int. Cl.
H04J 14/02 (2006.01)
H04L 12/26 (2006.01)
H04L 7/00 (2006.01)
H04B 10/27 (2013.01)

(52) U.S. Cl.
CPC ........ *H04J 14/023* (2013.01); *H04L 43/0864* (2013.01); *H04B 10/27* (2013.01); *H04L 7/0075* (2013.01)

(58) Field of Classification Search
CPC .................................................. H04J 14/0245
See application file for complete search history.

(56) References Cited

U.S. PATENT DOCUMENTS

| 7,606,490 | B2 | 10/2009 | Dalton et al. |
| 9,066,164 | B2 | 6/2015 | In De Betou et al. |
| 2015/0063812 | A1* | 3/2015 | Dove ...................... H04B 10/40 398/67 |
| 2015/0381300 | A1* | 12/2015 | Roberts ............ H04B 10/07955 398/68 |

* cited by examiner

Primary Examiner — Shi K Li  
(74) Attorney, Agent, or Firm — Schwegman Lundberg & Woessner, P.A.

(57) ABSTRACT

Systems and techniques for mitigating spectral excursions in a passive optical network (PON) are described herein. A spectral excursion may be determined in the PON. The spectral excursion may indicate a laser transmission output on the PON at a wavelength that is outside a designated wavelength range. A duration may be identified for the spectral excursion. A first preamble offset may be generated using the duration of the spectral excursion. A round trip delay for the PON and a local time of day may be determined. The first preamble offset, the round trip delay, and the local time of day may be transmitted to an optical line terminal (OLT).

26 Claims, 9 Drawing Sheets

MITIGATING SPECTRAL EXCURSIONS IN PASSIVE OPTICAL NETWORKS

TECHNICAL FIELD

This disclosure is generally related to computer networks and, more particularly, to optical networks.

BACKGROUND

A computer network is a collection of interconnected computing devices that may exchange data and share resources. Computer devices on the computer network may communicate with each other using a system of addresses such as internet protocol (IP) addresses. Optical networks may transmit information using signals generated by a laser establishing a channel between devices connected via an optical media. Optical networks may use multiplexing techniques to increase the number of channels sharing the optical media. The multiplexing techniques may divide signals into channels based on time and wavelength. The number of channels sharing the optical media may be increased by reducing the time and separation between each channel sharing the optical media. As the separation between channels is decreased, variances in laser transmission frequency may have the potential to cause errors in a neighboring channel.

SUMMARY

In general, this disclosure describes techniques that may mitigate short term spectral excursions (STSEs) in a passive optical network (PON). An optical line terminal (OLT) may synchronize the transmission of frames on its channel with other OLTs operating on the same optical distribution network (ODN) to reduce the occurrence or data errors caused by STSEs during burst transmissions on each channel. Additionally or alternatively, a transmission preamble may be modified to provide additional time for a transmitting laser to attain normal operating conditions after turn on. These techniques may reduce data errors by reducing transmissions on the ODN at frequencies outside a designated range for a channel thereby reducing the occurrence of errant signals on neighboring channels.

In one example, this disclosure is directed to a system for mitigating spectral excursions in a passive optical network (PON). The system comprises at least one processor and a memory including instructions that, when executed by the at least one processor, cause the at least one processor to perform operations to determine a spectral excursion in the PON, wherein the spectral excursion indicates a laser transmission output on the PON at a wavelength that is outside a designated wavelength range; identify a duration of the spectral excursion; generate a first preamble offset using the duration of the spectral excursion; determine a round trip delay for the PON and a local time of day; and transmit the first preamble offset, the round trip delay, and the local time of day to an optical line terminal (OLT).

In another example, this disclosure is directed to at least one machine readable medium including instructions for mitigating spectral excursions in a passive optical network (PON) that, when executed by a machine, cause the machine to perform operations to determine a spectral excursion in the PON, wherein the spectral excursion indicates a laser transmission output on the PON at a wavelength that is outside a designated wavelength range; identify a duration of the spectral excursion; generate a first preamble offset using the duration of the spectral excursion; determine a round trip delay for the PON and a local time of day; and transmit the first preamble offset, the round trip delay, and the local time of day to an optical line terminal (OLT).

In another example, this disclosure is directed to a method for mitigating spectral excursions in a passive optical network (PON). The method comprises determining a spectral excursion in the PON, wherein the spectral excursion indicates a laser transmission output on the PON at a wavelength that is outside a designated wavelength range; identifying a duration of the spectral excursion; generating a first preamble offset using the duration of the spectral excursion; determining a round trip delay for the PON and a local time of day; and transmitting the first preamble offset, the round trip delay, and the local time of day to an optical line terminal (OLT).

In another example, this disclosure is directed to an optical line terminal (OLT) for mitigating spectral excursions in a passive optical network (PON). The OLT comprises at least one processor, at least one transceiver, and a memory including instructions that, when executed by the at least one processor, cause the at least one processor to perform operations to determine a spectral excursion in the PON, wherein the spectral excursion indicates a laser transmission output on the PON at a wavelength that is outside a designated wavelength range; identify a duration of the spectral excursion; generate a first preamble offset using the duration of the spectral excursion; determine a round trip delay for the PON and a local time of day; and transmit the first preamble offset, the round trip delay, and the local time of day to at least one other OLT.

In another example, this disclosure is directed to an optical line terminal (OLT) for mitigating spectral excursions in a passive optical network (PON). The OLT comprises at least one processor, at least one transceiver, at least one laser, and a memory including instructions that, when executed by the at least one processor, cause the at least one processor to perform operations to receive a first preamble offset, a round trip delay, and a local time of day from another optical line terminal (OLT); synchronize an OLT time value with the local time of day; update a stored round trip delay value to match the received round trip delay; and modify a current preamble length using the received first preamble offset.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Computer networks may use a variety of technologies to enable to transfer of information between computers on the network. Passive optical networks (PON) use light signals transmitted over fiber optic cables to transmit data between computers on the network. As demand for increased bandwidth and network capacity grows, network operators seek ways to increase the signal carrying capacity of the fiber optic media.

Time and wavelength division multiplexing passive optical networks (TWDM-PON) is an option within the next-generation passive optical network 2 (NG-PON2) International Telecommunication Union (ITU) specifications (e.g., G.989.2 Dec. 5, 2014, G.989.3 Oct. 22, 2015) which uses dense wavelength division multiplexing (DWDM) lasers operating in burst mode. Using DWDM, a network provider may create multiple signal paths in the optical media separated by an optical wavelength. For example, several signals may be sent using respective wavelengths produced by a laser which may be separated by a separation such as 100 GHz. The signals may be combined to travel along an optical media to a splitter that may separate the signals using respective wavelengths.

DWDM lasers normally operate in a continuous mode and the use of DWDM lasers in burst mode in next generation passive optical network 2 (NG-PON2) may create a challenge that has been called short term spectral excursion (STSE). STSE is a phenomenon that happens when a burst mode laser switches from a fully off state to an on state (e.g., when sending a burst onto an optical distribution network (ODN)). Since the TWDM upstream may cause laser bursts and the lasers may emit virtually no light in between bursts, a conventional approach may be to apply near zero current to lasers that are not actively transmitting. However, when current is applied to a laser, there may be a wavelength shift. The wavelength shift is a more exaggerated form of a chirp that may occur when lasers are modulated from a 0 bit level state to a 1 bit level state. The 0 bit level in non-return-to-zero (NRZ) modulation may not be zero light but rather a lower power level of the light. The ratio between the 1 bit level power and the 0 bit level power in decibels, for example, is called the extinction ratio (ER).

Figure 3:
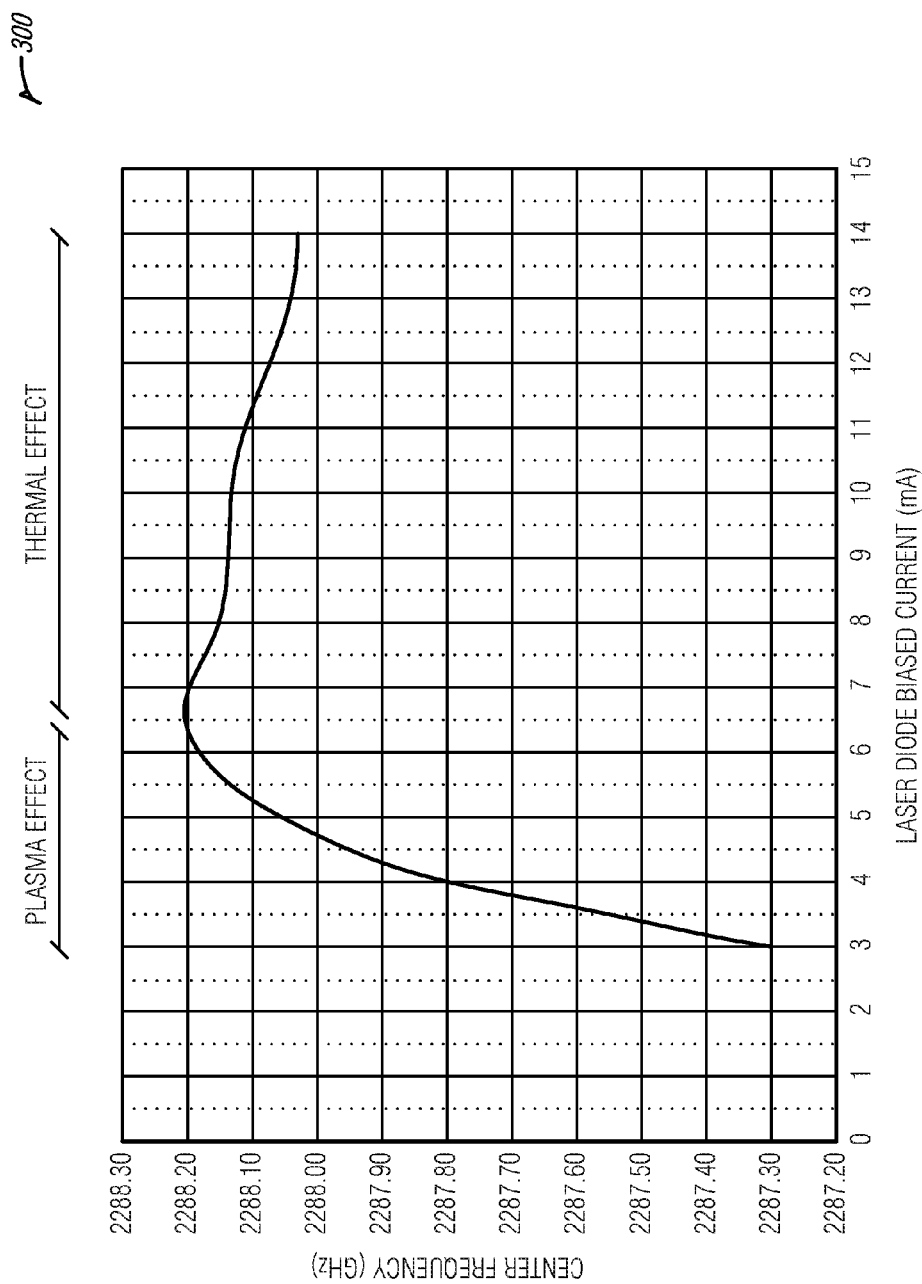
FIG. 3 illustrates an example of a graph of a short term spectral excursion caused by a plasma effect and a thermal effect.

The wavelength shift may initially be due to a plasma effect and later due to a thermal drift due to the heating effect of electrical current injection into the laser. The plasma effect and thermal effect may cause the laser to shift a wavelength into a neighboring wavelength range. For example, there may be a 100 GHz separation between the designated frequencies of a first wavelength and a neighboring second wavelength and a multiplexer may designate a range of plus and minus 50 GHz to reduce signal loss due to small variations in wavelength frequency. However, if the wavelength shift is large enough, optical power from the first wavelength may be included with the neighboring second wavelength, which may cause data errors in a data stream corresponding with the neighboring second wavelength. For example, FIG. 3 illustrates a wavelength shift of a laser caused by a plasma effect at laser turn on and a thermal effect as the laser reaches operating temperature.

Techniques using specialized hardware may be used to address the issue of STSE at the laser. However, these techniques may result in additional power consumption, heat generation, and may be costly. The present subject matter includes systems and techniques for addressing STSE without specialized laser equipment. Thus, STSEs may be addressed while limiting power, heat, and cost increases. The present subject matter may allow the use of lower cost lasers which may not require a tight STSE specification. In addition, higher density TWDM lasers (e.g., 50 GHz) may be feasible since low frequency STSEs (e.g., less than 25 GHz, etc.) may be mitigated allowing less separation between wavelengths.

Figure 4:
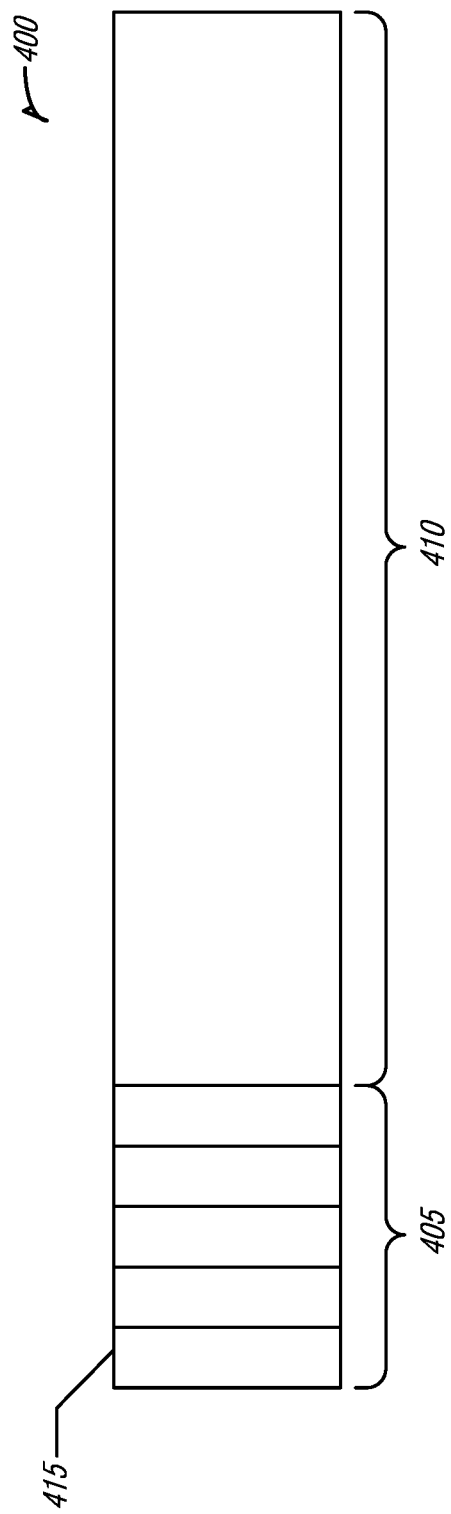
FIG. 4 illustrates an example of an upstream physical synchronization block in a passive optical network.

The PON may transmit frames that include an upstream physical synchronization block (PSBu) and an upstream framing sublayer burst (FSu). Frames may be transmitted at intervals such as, for example, 125 microseconds (µs). FIG. 4 illustrates an example of a PSBu in a passive optical network. The PSBu is comprised of a variable length preamble followed by a fixed length framing delimiter. The length of the preamble and the delimiter may be determined by an optical line terminal (OLT) controlling the channel on which the frames are transmitted. The preamble may include a number of timeslots. Each timeslot may represent one quanta of bandwidth allocation (e.g., a smallest unit of bandwidth available for allocation, etc.). For example, in an NG-PON2 network operating at 10 gigabits per second, a timeslot may be 12.8 milliseconds (ms) and a quanta of bandwidth allocation may be the amount of data that may be transmitted in 12.8 ms.

The PSBu timeslots are used to synchronize the OLT burst receiver for a new transmission from an ONT. The preamble time may account for ONT laser turn-on time, STSE, OLT receiver AC coupling, and OLT clock and data recovery (CDR). Once all of the preamble turn-on requirements have been met, the delimiter is ready to be received by the OLT such that framing of the transmission can begin. The FSu may include one or more bandwidth allocations assigned to an ONT for data transmission on the PON (e.g., to transmit data to the OLT, another ONT, etc.).

STSEs may occur predictably at the beginning of the preamble. Thus, the present subject matter may synchronize PSBus of increased length across networking devices (e.g., OLTs and ONTs) attached to the PON to reduce the impact of STSEs. By increasing the length of the PSBu, the networking devices may transmit after the laser has passed through a period of STSE. Thus, the laser may be transmitting within a designated range for the transmission wavelength which may result in reduced optical power leakage into neighboring channels (e.g., as designated by wavelengths, etc.).

Each channel of a TWDM PON may operate independently and may have full control over the upstream bandwidth allocation of the subtending optical network units (ONTs), also referred to as optical network units (ONUs), on its assigned channel. The present subject matter involves an optical line terminal (OLT) synchronizing its own PSBu timeslots with ONTs on its channel, and other OLTs on the ODN such that the STSE of an adjacent channel occurs during a pre-determined preamble time where disruption from an adjacent channel will not cause uncorrectable transmission errors.

Figure 1:
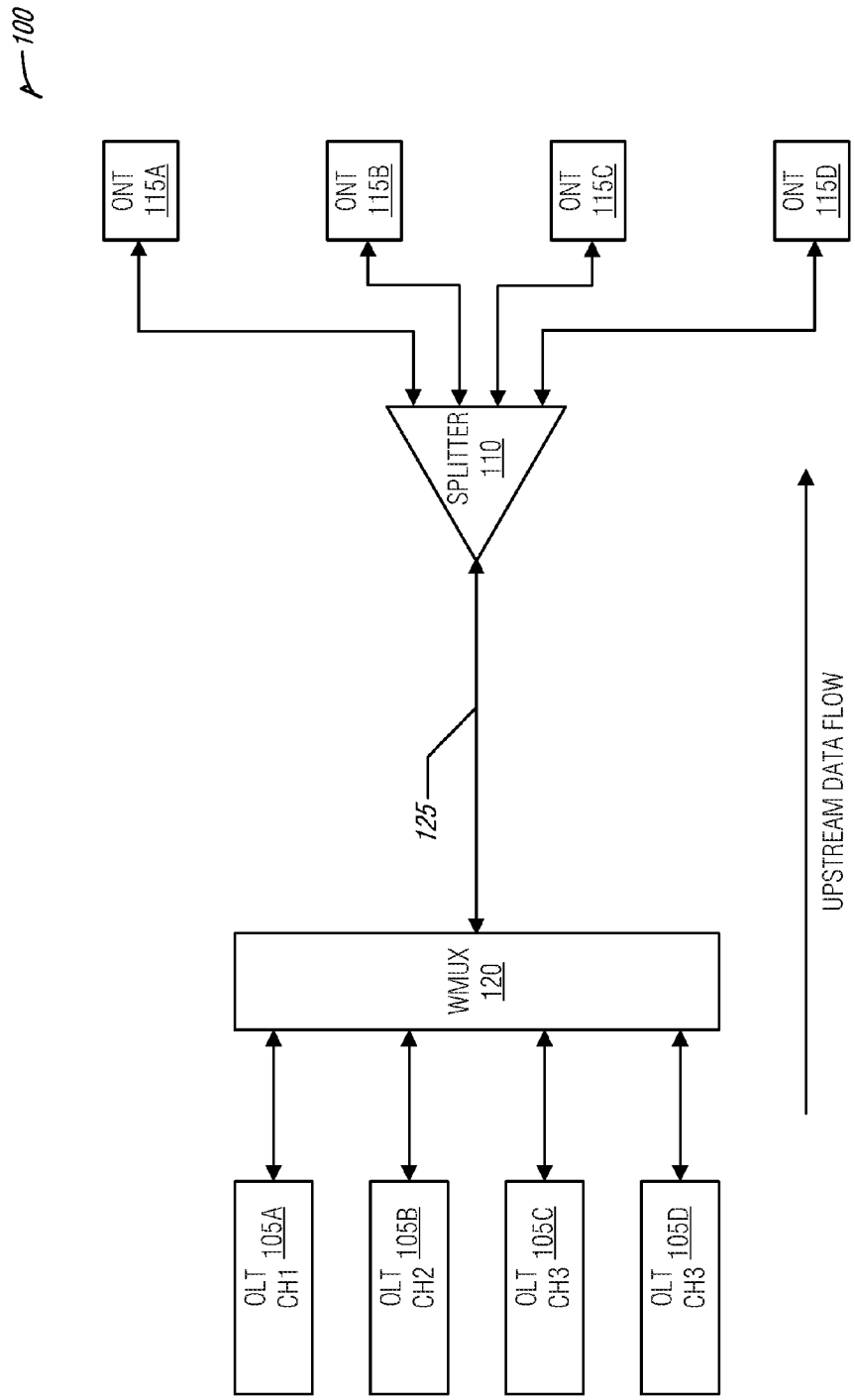
FIG. 1 illustrates a passive optical network in which a short term spectral excursion on one channel may cause data errors on adjacent channels, according to various embodiments.

FIG. 1 illustrates a passive optical network (PON) 100 in which a short term spectral excursion (STSE) on one channel may cause data errors on adjacent channels, according to various embodiments. The PON 100 may be representative of a time and wavelength division multiplexing (TWDM) PON. The PON 100 may include a set of optical line terminals (OLTs) 105A-D collectively referred to in this disclosure as OLTs 105. The OLTs 105 may include one or more lasers used to generate optical signals for transmission on an optical distribution network (ODN). Each of the OLTs 105 may be designated to operate on a channel with a corresponding wavelength. For example, channel 1 may correspond with an upstream wavelength of 1532.68 nanometers (nm) and a downstream wavelength of 1596.34 nm, channel 2 may correspond with an upstream wavelength of 1533.47 nm and a downstream wavelength of 1597.18 nm, etc.

A wavelength division multiplexer (WMUX) 120 may receive the optical signals generated by the one or more lasers of each of the OLTs 105 and may combine the optical signals for upstream transmission onto a fiber optic cable 125 of the ODN. For example, a combined upstream optical signal may include wavelengths between 1532 nm and 1544 nm which includes the 1532.68 nm upstream wavelength for an OLT 105A transmitting on channel 1 and the 1533.47 nm upstream wavelength for an OLT 105B transmitting on channel 2.

The splitter 110 may receive the combined optical upstream signal and may split the signal amongst one or more optical network terminals (ONTs) 115A-D collectively referred to in this disclosure as ONTs 115, also referred to as optical network units (ONUs). The ONTs 115 may be capable of actively tuning (e.g., using tunable optical filters, etc.) to one or more wavelength frequency (e.g., channel) for receiving optical signals at various wavelengths. The ONTs 115 may transmit optical signals onto the ODN using a laser generating an optical signal at a wavelength corresponding to its designated channel(s). For example, an ONT 115A transmitting on channel 1 may use its laser to generate an optical signal at a wavelength of 1596.34 nm and an ONT 115B transmitting on channel 2 may use its laser to generate an optical signal at a wavelength of 1597.18 nm. The optical signals from each of the ONTs 115A and B may be combined into a combined downstream optical signal by the splitter 110 and may continue transmission along the fiber optic cable 125 of the ODN.

The WMUX 120 may receive the combined downstream optical signal including the optical signals at various wavelengths generated by each of the ONTs 115. For example, the combined downstream optical signal may include wavelengths between 1596 nm and 1603 nm and may include the optical signal transmitted by the ONT 115A on channel 1 at 1596.34 nm and the optical signal transmitted by the ONT 115B on channel 2 at 1597.18 nm. The WMUX 120 may demultiplex (e.g., using optical filters, etc.) the combined downstream optical signal into wavelength components for transmission to the OLTs 105 operating on corresponding channels. For example, the downstream transmission of the ONT 115A on channel 1 may be transmitted to the OLT 105A operating on channel 1.

Each of the ONTs 115 may be able to transmit on multiple channels (e.g., using different wavelengths) and may turn its laser off and on (e.g., bursting) as transmissions are made on each channel. The bursting of the lasers in the ONTs 115 creates time division among the transmissions on the ODN. The laser in each of the ONTs 115 may experience short term spectral excursion (STSE) when the laser is rapidly powered at the beginning of each burst due to the rapid application of current to the laser substrate and temperature fluctuations as the laser approaches a normal operating temperature (e.g., a temperature at which frequency variation is minimized) causing transmissions by the laser at frequencies outside what is allowed for the designated channel. These transmissions may bleed into other channels as the STSE may be large enough to encroach on the filter range of a neighboring channel. Thus, an errant signal may pass through the WMUX 120 or a filter on the PON and be transmitted to an incorrect receiver resulting in data errors. Each of the ONTs 115 may burst many times per second (e.g., more than 1000 or less than 1000). In addition, the PON may contain a large number of ONTs 115 (e.g., more than 128 ONTs or less than 128 ONTs). The large number of ONTs 115 on the PON combined with the number of burst cycles for each of the ONTs 115 may result in an increase in the number of data errors caused by wavelength bleed (e.g., transmissions with a wavelength frequency overlapping a wavelength frequency of a neighboring channel) due to STSEs.

Figure 2:
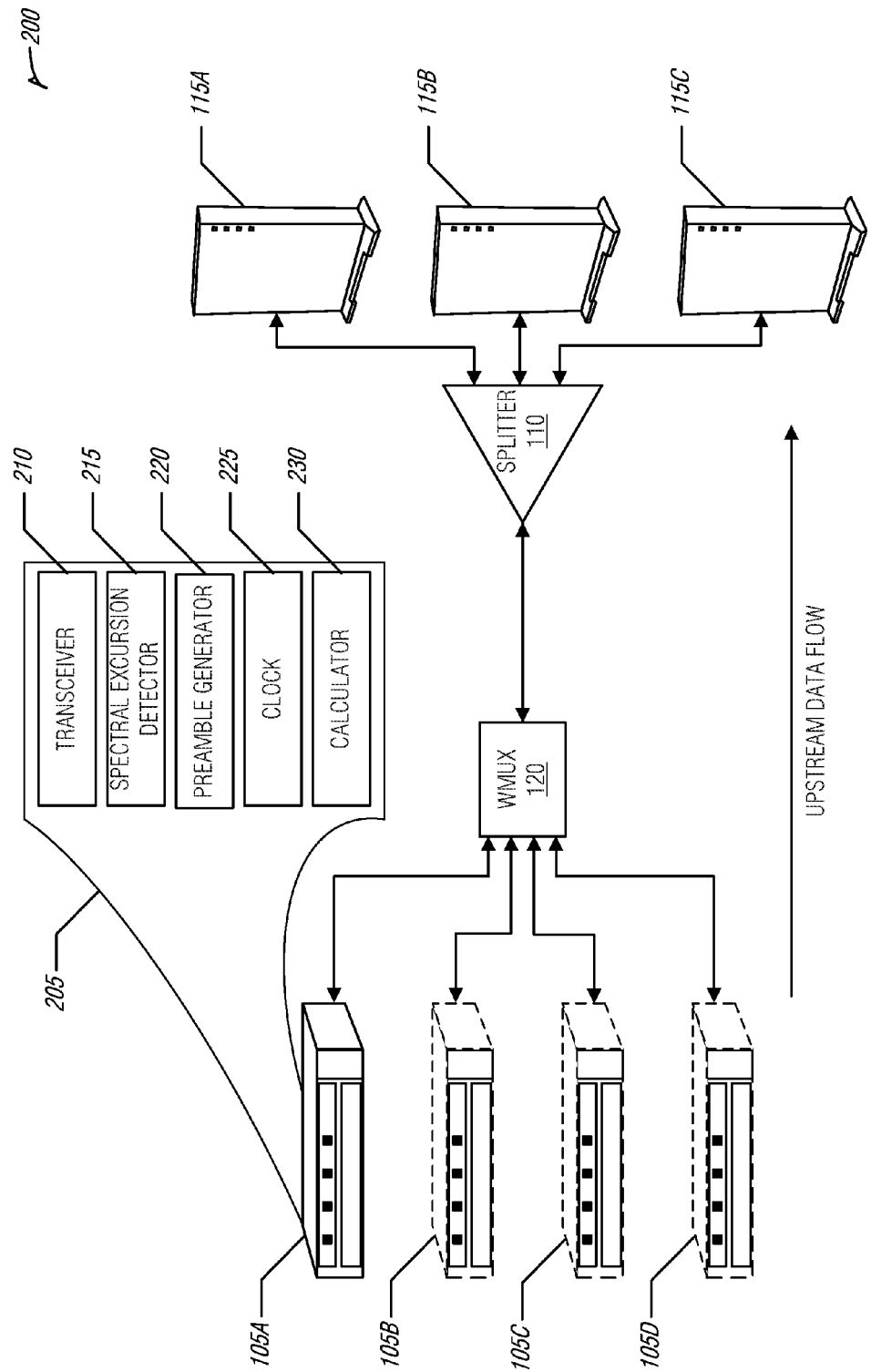
FIG. 2 illustrates an example of a passive optical network and system for mitigating spectral excursions that may cause data errors among various channels of the passive optical network, according to various embodiments.

FIG. 2 illustrates an example of a passive optical network (PON) 200 and system 205 for mitigating spectral excursions that may cause data errors among various channels of the passive optical network, according to various embodiments. The PON 200 may provide similar functionality as described in FIG. 1. The PON 200 may include one or more optical line terminals (OLTs) 105A-105D collectively referred to in this disclosure as the OLTs 105, a wavelength division multiplexer (WMUX) 120, a splitter 110, and one or more optical network terminals (ONTs) 115A-115C collectively referred to in this disclosure as ONTs 115 (also referred to as optical network units (ONUs)). The OLTs 105 may operate on different channels each with a designated wavelength for upstream and downstream traffic as described above with respect to FIG. 1. The optical signals corresponding with each of the OLTs 105 may be multiplexed into a single optical signal and demultiplexed into wavelength component optical signals by the WMUX 120. The splitter 110 may split the single optical signal into individual full spectrum streams to each of the ONTs 115 and may combine signals received from the ONTs 115 into the single optical signal.

Each of the OLTs 105 may act as a controller for a respective channel of the passive optical network (PON). The OLT 105 may transmit physical layer operations and maintenance (PLOAM) messages to each device operating on its designated channel (e.g., the ONTs 115) which may include an upstream physical synchronization block (PSBu). The OLT s105 may generate a PSBu for managing physical layer activities (e.g., ONT laser turn-on time, OLT receiver AC coupling, and OLT clock and data recovery (CDR), etc.) prior to data transmission. The PSBu may include a preamble section and a frame delimiter indicating a starting point of a data transmission.

Figure 7:
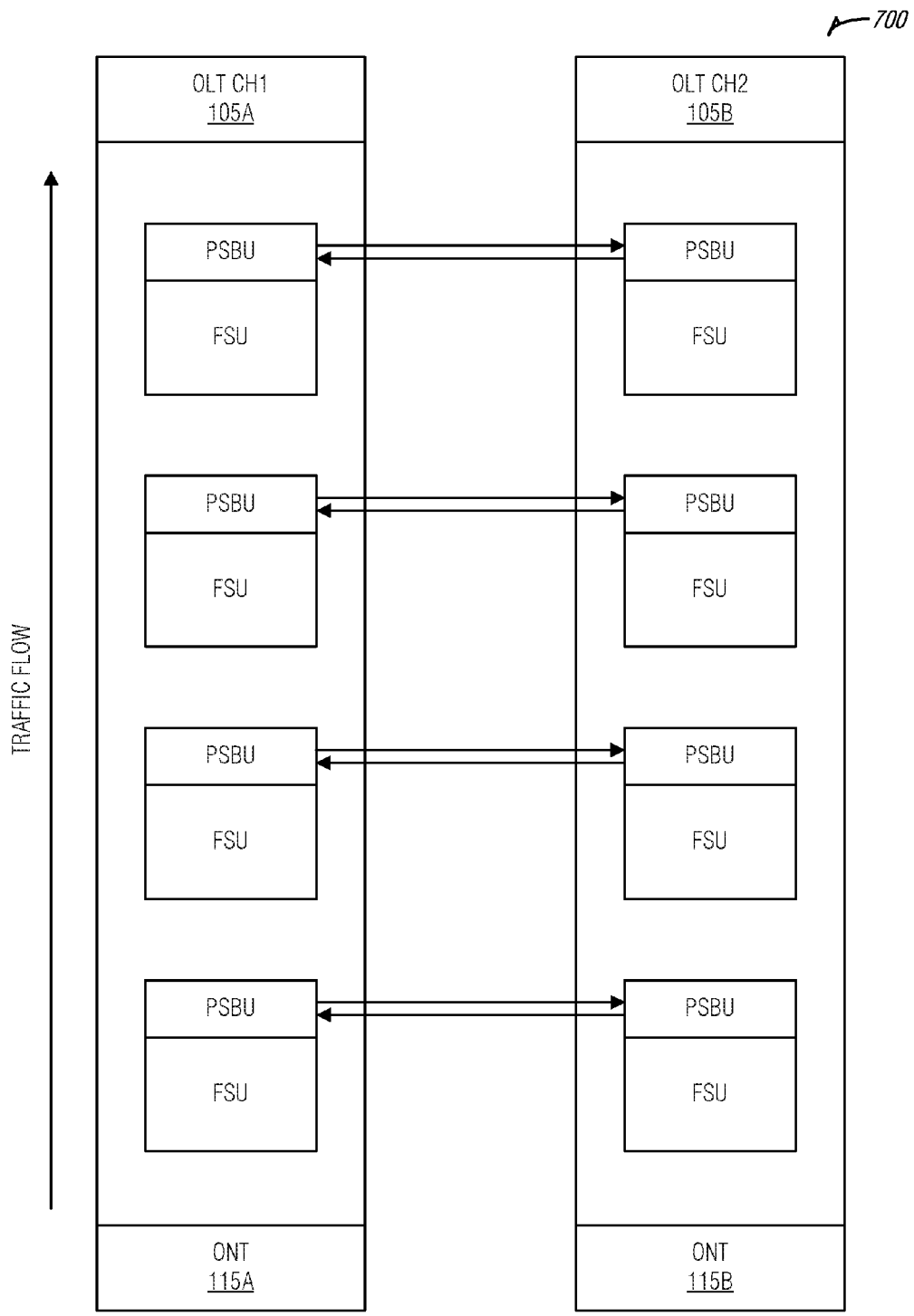
FIG. 7 illustrates an example of traffic flow on an optical distribution network including upstream physical synchronization blocks synchronized along two channels of a passive optical network to address short term spectral excursions, according to various embodiments.

Each of the OLTs 105 may synchronize its ONT laser turn on times with each of the other OLTs 105. The OLTs 105 may synchronize (e.g., as shown in FIG. 7) their respective ONT turn on times by exchanging time of day, return time delay, and preamble lengths. Each OLT 105 may then adjust its PSBu based on the exchanged information. Each of the OLTs 105 may in turn synchronize the PSBu with each of the ONTs 115 operating on each of the OLTs' 105 designated channel for use in data transmission and data reception. By synchronizing the ONT turn on times, each channel may provide a window of time in which data should not be transmitted (e.g., during PSBu processing) which may prevent an STSE from overlapping into a neighboring channel. The OLTs 105 may manage bandwidth allocations for each of the ONTs 115 and may use the PSBu and allocation identifiers (Alloc-IDs) to reduce the occurrence of errors resulting from STSEs on their channel.

Each of the OLTs 105 may distribute bandwidth allocations to each of the ONTs 115 on its respective channel representing an interval of time during which the ONTs 115 may transmit data. The ONTs 115 may have multiple allocation identifiers (Alloc-IDs) assigned which may use multiple bandwidth allocations to service each of them. In some examples, a single PSBu may be sent followed by many Alloc-IDs as long as they are from the same physical ONT 115.

The OLTs 105 may include a system 205 for mitigating spectral excursions in a passive optical network. The system 205 may include a variety of components including a transceiver 210, a spectral excursion detector 215, a preamble generator 220, a clock 225, and a calculator 230.

The transceiver 210 may be responsible for processing incoming and outgoing data. The transceiver 210 may receive data regarding the output of a laser included in the OLTs 105. The transceiver 210 may transmit the data regarding the output of the laser to the spectral excursion detector 215.

The spectral excursion detector 215 may analyze network error data to determine if an STSE has occurred. In an example, the spectral excursion detector 215 may use feedback from errors on the network and/or corrected errors on the network to determine if an STSE has occurred. For example, the spectral excursion detector 215 may detect an increase in data transmission errors on a second channel of the PON when an ONT on a first channel (e.g., ONT 115A) is transmitting.

In some examples, the spectral excursion detector 215 may determine an STSE has occurred based on the detection of a laser operating on a channel on the PON outside a designated frequency range. For example, the spectral excursion detector 215 may compare the output frequency to a frequency range corresponding to a channel on which the laser is configured to transmit to determine whether a short term spectral excursion has occurred. For example, the laser of the OLT 105 may be configured to transmit on channel 1 at a wavelength of 1532.68 nm with a frequency range of 195550 GHz to 195650 GHz and the spectral excursion detector 215 may determine that a STSE has occurred if the laser's output frequency is below 195550 GHz or above 195650 GHz.

The spectral excursion detector 215 may operate in conjunction with the clock 225 and the calculator 230 to determine a duration for the STSE. The spectral excursion detector 215 may request a time of day from the clock 225 when the STSE is detected and when the STSE is no longer detected and may make a request to the calculator 230 to determine a difference between the time of day when the STSE was detected and when the STSE was no longer detected to identify a duration of the STSE. The spectral excursion detector 215 may transmit the duration of the STSE to the preamble generator 220 to generate a preamble offset to address the STSE. In some examples, the spectral excursion may be received as a value from a firmware of the OLT 105.

In some examples, the spectral excursion detector 215, may assume a max excursion duration for the STSE (e.g., based on a laser manufacture's maximum STSE duration for a laser stored in memory, etc.) and may transmit the maximum duration of the STSE to the preamble generator 220 to generate a preamble offset to address the STSE. In some examples, the spectral excursion detector 215 may measure the STSE duration by identifying when a first ONU (e.g., ONU 115A) is bursting on a first channel, identifying that the STSE goes in the direction of a higher second channel, and identifying that there is a burst in the second channel from a second ONU (e.g., ONU 115B) that is receiving errors whenever the first ONU is transmitting at the same time. The spectral excursion detector 215 may transmit a duration of the error period to the preamble generator 220 to increase the preamble for the first ONU operating on channel 1.

In some examples, the PON may include ONUs 115 with STSEs that fall within a set of specified limits (e.g., such that they may not interfere with other ONUs 115 transmitting on adjacent channels, etc.) and the preamble may not be altered.

Figure 5:
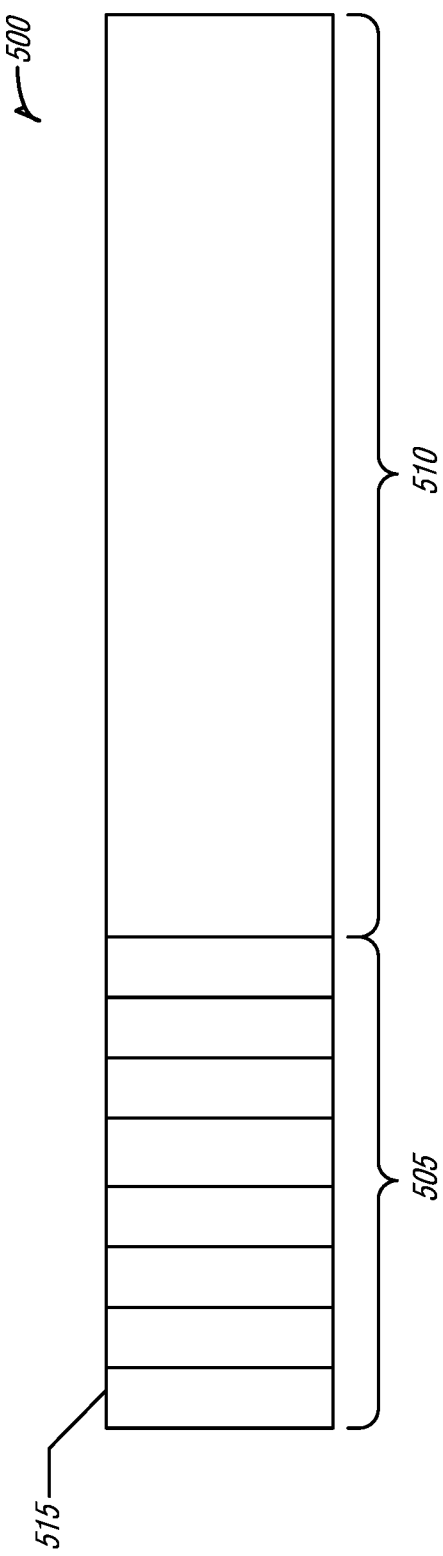
FIG. 5 illustrates an example of an upstream physical synchronization block modified to address short term spectral excursions in a passive optical network, according to various embodiments.

The preamble generator 220 may receive the duration of the STSE and may generate a first preamble offset using the duration of the STSE. For example, the duration of the STSE may have been identified as 2 nanoseconds (ns) and the preamble generator 220 may generate a preamble offset of 2 ns. The preamble generator 220 may obtain a current PSBu (e.g., as shown in FIG. 4) for the OLT 105 and may use the preamble offset to generate a new PSBu with a preamble section lengthened using the preamble offset (e.g., as shown in FIG. 5). For example, the OLT's 105 existing PSBu may include a preamble section of a length of 20 bytes and the preamble may be increased by a number of bytes that may be transmitted at the OLT's 105 maximum transmission speed in 2 ns. In an example, the PSBu length may be increased by adding timeslots. The additional timeslots may be associated with a bandwidth allocation representing a minimum bandwidth allocation for the OLT 105. The PSBu may occupy one or more additional transmission timeslots which may each increase the length of the PSBu resulting in a longer period of time between the start of the PSBu and the beginning of the framing delimiter.

In some examples, the preamble generator 220 may create super-slots comprised of a fixed number of upstream timeslots. For example, there may be 9720 upstream timeslots defined per 125 microsecond (µs) frame resulting in each timeslot having a duration of 12.8 ns. The preamble generator 220 may specify in a bandwidth map the start time and the length of the PSBu. Depending on whether the ONT 115 is using a 2.5 gigabit or a 10.0 gigabit laser, each time slot may carry four bytes or sixteen bytes respectively. Some of the timeslots may be reserved for the PSBu.

Consider an ONT 115 that has just received an upstream allocation and is now scheduled to turn its laser on. If the laser violates the STSE specification, the laser turn-on at the beginning of the PSBu may temporarily cause energy to be sent on an adjacent channel. If this adjacent channel has a valid transmission underway, the glitch may cause errors to be generated. Upstream forward error correction (FEC) may repair some level of bit errors, however FEC may be used to repair errors caused by the maximum split/reach to attain a desired sensitivity and loss plan. Thus, the additional errors caused by the STSE event may not be corrected by FEC and may be detected as 'uncorrectable' by the OLT 105. Depending on where the error occurs, a single frame or multiple frames may be discarded by the receiving OLT 105. However, if the STSE event occurs at the same time as a PSBu of an adjacent channel, then the error will go unnoticed and will not affect the transmission since no user data may currently be present.

Synchronizing PSBu timeslots on an OLT port may use TOD (Time of Day) synchronization as well as a common equalization (e.g., maximum round trip time (RTT), round trip delay, etc.) across all channels of an optical distribution network (ODN) group (e.g., across each OLT 105). Round trip time (RTT) may already be synchronized for quick handoff of one passive optical network (PON) to another so there may be little additional burden caused by synchronizing the RTT with the PSBu. Time-of-day (TOD) synchronization may ensure that start-of-frames occur at the same physical time and that the OLTs' 105 and the ONTs' 115 upstream transmissions are synchronized.

The preamble generator 220 may request that the calculator 230 calculate a maximum round trip time (RTT) value for the ODN. The maximum round trip time value may indicate the maximum time taken for a data packet to be sent from a device (e.g., the OLT 105, ONTs 115, etc.) on the ODN and for a receipt acknowledgement to be received from another device on the ODN. The RTT may be used to determine a round trip delay for each OLT 105 and ONT 115 on the ODN. The newly generated PSBu, the TOD, and the round trip delay may be transmitted to (e.g., synchronized with) each OLT 105 operating on the ODN using the transceiver 210. Each OLT 105 may then synchronize the values with each ONT 115 operating on the OLT's 105 channel. In an example, communication between OLTs 105 on each channel may be accomplished using inter-channel termination protocol (ICTP). Since the bandwidth allocation of any given time and wavelength domain passive optical network (TWDM-PON) port may be completely under the control of the channel's OLT 105, this method will not violate any standard and may use constructs defined within the governing standard.

In some examples, the preamble generator 220 may generate a set of ranging windows (e.g., quiet periods) for synchronization across the ODN. When an ONT 115 joins the ODN it may synchronize itself to a reference delay (e.g., a standard transmission delay provided by the OLT 105, etc.) based on a distance from the OLT 105. This ranging activity may set a transmission delay for each ONT 115 that allows ONTs 115 further from the OLT 105 to transmit before ONTs 115 closer to the OLT 105. This may accommodate for proximity based latency and prevent ONTs 115 closer to the OLT 105 from obtaining transmission preference. During a ranging window, the turn on time of an ONT 115 may be indeterminate and may cause uncorrectable errors on an adjacent channel if the event occurs during a valid transmission. However, if the ranging windows are synchronized across channels (e.g., across the OLTs 105), an STSE event may occur during a ranging window on the adjacent channel and may not disrupt normal transmission. In the event that an STSE disrupts a range response, a random backoff algorithm inherent in the ranging protocol may deal with error caused by the STSE. Thus, the preamble generator 220 may determine a set of ranging windows (e.g., including a ranging window for each channel operating on the ODN, etc.) for the ODN. The set of ranging windows may be transmitted to other OLTs 105 and the ONTs 115 connected to the ODN.

The present subject matter may allow for adjustment of the preamble length to manage tradeoffs between a reduction in STSE transmission errors and the overhead (e.g., reduced bandwidth, etc.) resulting from the increased preamble length. Frames on the PON may be associated with a time frame (T-Frame). For example, each frame on the PON may have a duration of 125 nanoseconds (µs). Each frame may be divided into timeslots that may represent a bandwidth allocation according to the amount of data (e.g., based on maximum transmission speed of the PON, etc.) that may be transmitted during the timeslot. For example, one timeslot may be 12.8 µs and may represent 128 kilobits of data for a 10G ONT. The maximum bandwidth lost by increasing the number of timeslots in the preamble may be equal to (PSBu-time*N-Allocations per T-Frame)/T-Frame-Time (125 µs). In an example with a PSBu time of 250 ns (e.g., approx. 38 time slots) and 16 allocations per time frame (e.g., each of the 128 ONTs 115 may transmit once per ms), the maximum bandwidth lost may equal 320 Mbs (e.g., 250 ns*16/125 µs) or 3.2% Overhead. Overhead may be reduced by decreasing the number of allocations per millisecond, or by decreasing the PSBu time.

Low bandwidth granularity may arise from fixed length allocations. Each ONT 115 may have nothing to send except a status report on an assigned alloc-id. It may be desirable to poll each ONT 115 every millisecond for a queue backlog report, which may use an allocation of a few timeslots (plus the PSBu). The present subject matter uses bandwidth allocations that may have a minimum allocation that is fixed and may be larger than desired requiring additional DBA startup latency. For example, a minimum allocation may equal 9720/N (e.g., number of allocations per timeslot) resulting in approximately 607 timeslots in an environment with 16 allocations per timeslot. The PSBu timeslots (e.g., 38 timeslots for a 250 ms PSBU as calculated above) are subtracted from the available timeslots to calculate the minimum ONT bandwidth. This may result in an ONT minimum bandwidth of 72.8 megabits per second (Mbs) (e.g., 607-38*128 Kbs).

If an ONT 115 transmits every millisecond, the minimum bandwidth assignable may be 72.8 Mbs. This may be reduced by having the ONT 115 transmit at intervals greater than 1 ms, but may come at the expense of dynamic bandwidth allocation (DBA) startup latency since queue reports may take longer than 1 ms to be received. The number of allocations per timeslot may be increased to decrease the minimum allocation, however, this may come at the expense of lost bandwidth maximum. Thus, the present subject matter may allow for the adjustment of allocations and preambles. Therefore, the PON may be fine-tuned to balance bandwidth and latency concerns with the risks of data errors due to STSEs.

The present subject matter may be implemented in various configurations. For example, the transceiver 210, the spectral excursion detector 215, the preamble generator 220, the clock 225, and the calculator 230 may be implemented in different (or the same) computing systems (e.g., an OLT, a single server, a collection of servers, a cloud-based computing platform, etc.). A computing system may comprise one or more processors (e.g., hardware processor 902 described in FIG. 9, etc.) that execute software instructions, such as those used to define a software or computer program, stored in a computer-readable storage medium such as a memory device (e.g., a main memory 904 and a static memory 906 as described in FIG. 9, a Flash memory, random access memory (RAM), or any other type of volatile or non-volatile memory that stores instructions), or a storage device (e.g., a disk drive, or an optical drive). Alternatively, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

FIG. 3 illustrates an example of a graph 300 of a short term spectral excursion caused by a plasma effect and a thermal effect. As shown in graph 300, the center frequency of the laser diode shifts sharply upward when the laser diode biased current is between 3 milliamps (mA) and 6.5 mA. This initial shift may be called a plasma effect and may result in laser transmissions outside a wavelength threshold (e.g., +−50 GHz, etc.) for a channel of a passive optical network (PON). As the laser diode reaches operating temperature between 6.5 mA and 14 mA of current a gradual shift may occur due to a thermal effect (e.g., the heating of the laser). The thermal effect may cause additional frequency shift that may also contribute to a laser diode outputting at a frequency outside a designated frequency range resulting in a transmission in a wavelength outside of a wavelength threshold for the channel of the PON.

FIG. 4 illustrates an example of an upstream physical synchronization block (PSBu) 400 in a passive optical network (PON). The PON may transmit frames that include the PSBu 400. The PSBu 400 may comprised of a variable length preamble 405 followed by a fixed length framing delimiter 410. The length of the preamble 405 and the delimiter 410 may be determined by an optical line terminal (OLT) controlling the channel on which the PSBu 400 is transmitted. The preamble 405 may include a number of timeslots 415. Each timeslot 415 may represent one quanta of bandwidth allocation (e.g., a smallest unit of bandwidth available for allocation, etc.). For example, in an NG-PON2 network operating at 10 gigabits per second, the timeslot 415 may be 12.8 milliseconds (ms) and a quanta of bandwidth allocation may be the amount of data that may be transmitted in 12.8 ms.

The timeslots 415 included in the PSBu 400 may be used to synchronize the OLT burst receiver for a new transmission from an ONT. The preamble 410 time accounts for ONT laser turn-on time, STSE, OLT receiver AC coupling, and OLT clock and data recovery (CDR). Once all of the preamble turn-on requirements have been met, the delimiter 415 may be ready to be received by the OLT such that framing of the transmission can begin.

FIG. 5 illustrates an example of an upstream physical synchronization block (PSBu) 500 modified to address short term spectral excursions in a passive optical network (PON), according to various embodiments. The PSBu 500 may provide similar functionality as the PSBu 400 described in FIG. 4. The PSBu 500 may include a preamble 505 and a delimiter 510. To address short term spectral excursions on the PON, additional timeslots 515 may be added to the preamble 505 of the PSBu 500. The additional timeslots 515 increase the overall length of the PSBu 500 allowing additional time for laser turn-on activities such as, for example, ONT laser turn-on time, STSE, OLT receiver AC coupling, and OLT clock and data recovery (CDR). The length of the delimiter 510 may remain unchanged. Thus, the bandwidth allocations for the PSBu 500 may be increased in proportion with the additional timeslots 515 added to the preamble.

Figure 6:
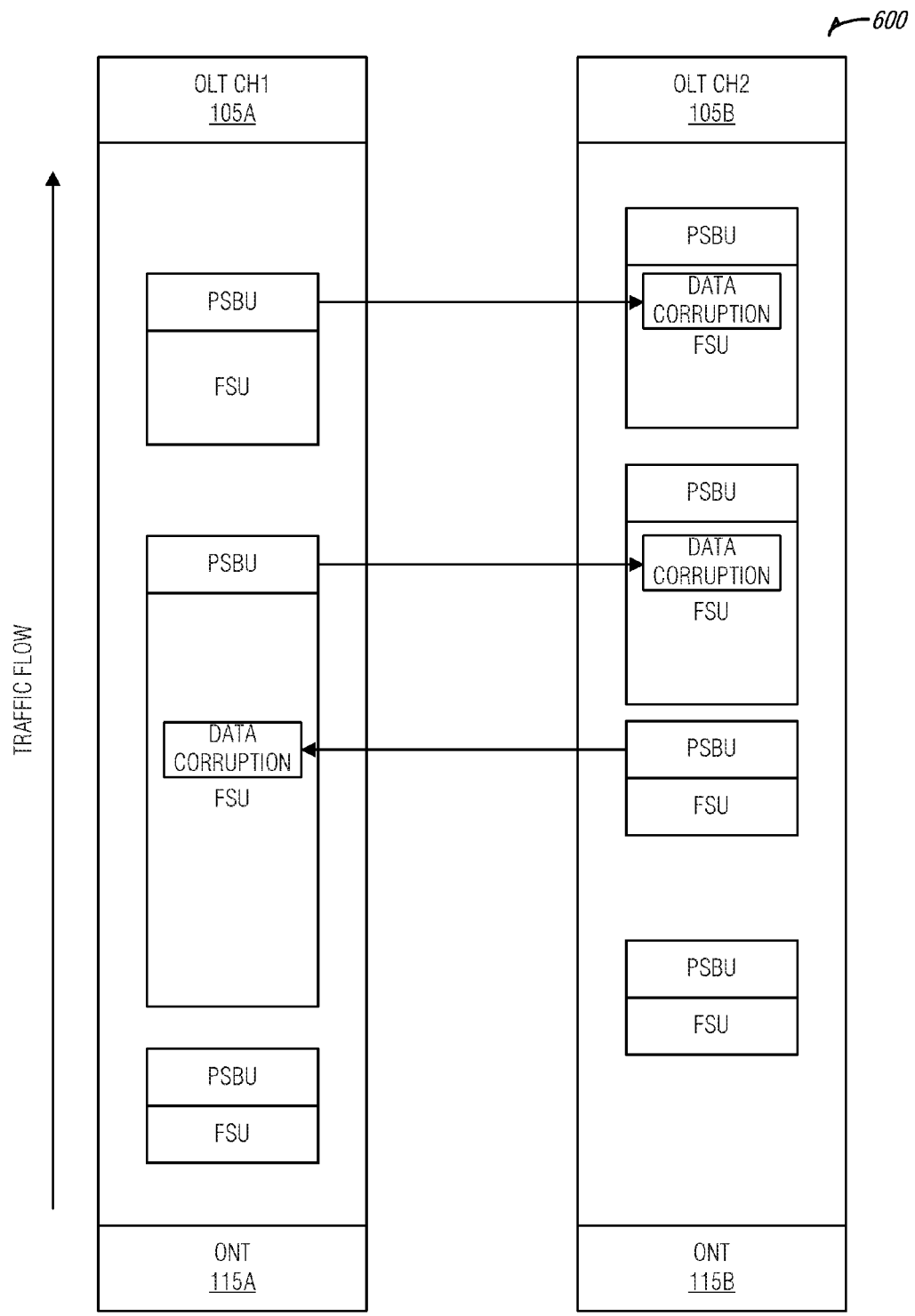
FIG. 6 illustrates an example of traffic flow on an optical distribution network including upstream physical synchronization blocks along two channels of a passive optical network.

FIG. 6 illustrates an example of traffic flow 600 on an optical distribution network (ODN) including upstream physical synchronization blocks along two channels of a passive optical network. The traffic flow 600 may include traffic flowing between an optical network terminal (ONT) 115A and an optical line terminal (OLT) 105A operating on channel 1. In addition, the traffic flow 600 may include traffic flowing between an optical network terminal (ONT) 115B and an optical line terminal (OLT) 105B operating on channel 2. The traffic flow 600 illustrates data corruption that may occur when short term spectral excursions occur during PSBu transmission. For example, when a PSBu transmission by ONT 115A on channel 1 overlaps with an FSu transmitted by ONT 115 B on channel 2, a short term spectral excursion may occur in a laser in ONT 115A causing the laser to temporarily transmit at a wavelength designated for channel 2. Thus, the OLT 105B on channel 2 may receive errant data from ONT 115A on channel 1.

FIG. 7 illustrates an example of traffic flow 700 on an optical distribution network (ODN) including upstream physical synchronization blocks synchronized along two channels of a passive optical network to address short term spectral excursions, according to various embodiments. The traffic flow 700 may include traffic flowing between an optical network terminal (ONT) 115A and an optical line terminal (OLT) 105A operating on channel 1. In addition, the traffic flow 700 may include traffic flowing between an optical network terminal (ONT) 115B and an optical line terminal (OLT) 105B operating on channel 2. The traffic flow 700 illustrates the synchronization of laser turn-on across channels 1 and 2. The synchronization may completed using the techniques described in FIG. 2 and may reduce the occurrence of data corruption caused by a short term spectral excursion (e.g., as shown in FIG. 6).

Figure 8:
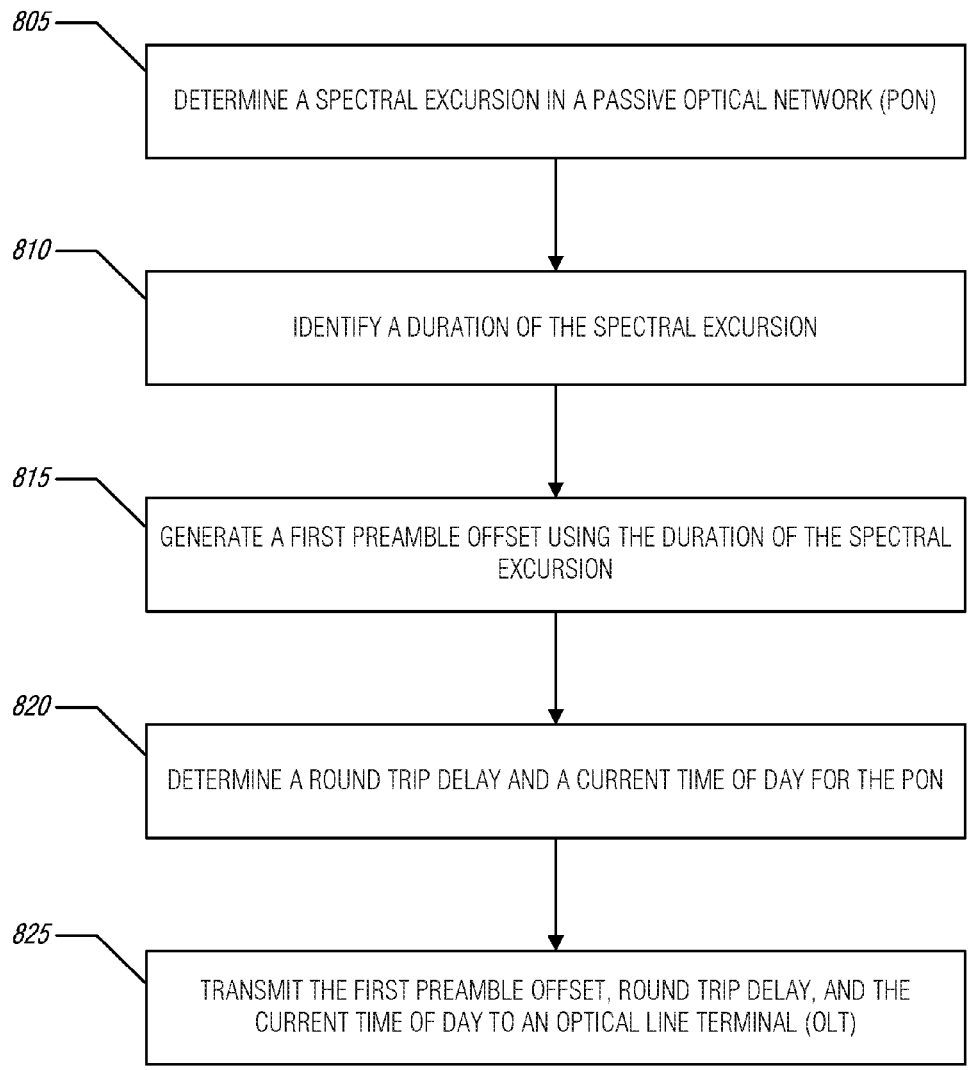
FIG. 8 illustrates an example of a method for mitigating spectral excursions in passive optical networks, according to various embodiments.

FIG. 8 illustrates an example of a method 800 for mitigating spectral excursions in passive optical networks, according to various embodiments.

At operation 805, it may be determined (e.g., using the spectral excursion detector 215 as described in FIG. 2) that a spectral excursion may have occurred in a passive optical network (PON). The spectral excursion may indicate a laser transmission output on the PON at a wavelength that is outside a designated wavelength range.

At operation 810, a duration may be identified for the spectral excursion. For example, the clock 225 and the calculator 230 as described in FIG. 2, may determine how long the spectral excursion lasted.

At operation 815, a first preamble offset may be generated (e.g., using the preamble generator 220 as described in FIG. 2) using the duration of the spectral excursion. In an example, the first preamble offset may increase the length of a preamble included in a physical synchronization block (e.g., an upstream physical synchronization block (PSBu)).

At operation 820, a round trip delay and a current time of day may be determined (e.g., using the clock 225 and the calculator 230 as described in FIG. 2) for the PON.

At operation 825, the first preamble offset, the round trip delay, and the current time of day may be transmitted (e.g., using the transceiver 210 as described in FIG. 2) to an optical line terminal (OLT).

In some examples, a ranging window may be determined using the preamble offset and the ranging window may be transmitted to the optical network terminal (OLT).

In some examples, a second preamble offset may be generated that is shorter in length than the first preamble offset. For example, the first preamble offset may consist of two timeslots and the second preamble offset may consist of less than two timeslots. A preamble configuration may be created using the first preamble offset and the second preamble offset. The preamble configuration may include using the first preamble offset during a burst transmission using a laser of the OLT and using the second preamble offset during a continuous transmission using the laser the OLT. The preamble configuration may be transmitted to the OLT. In an example, the preamble configuration may include a channel schedule including instructions for scheduling transmissions across multiple wavelengths where each wavelength corresponds to a respective transmission channel.

Figure 9:
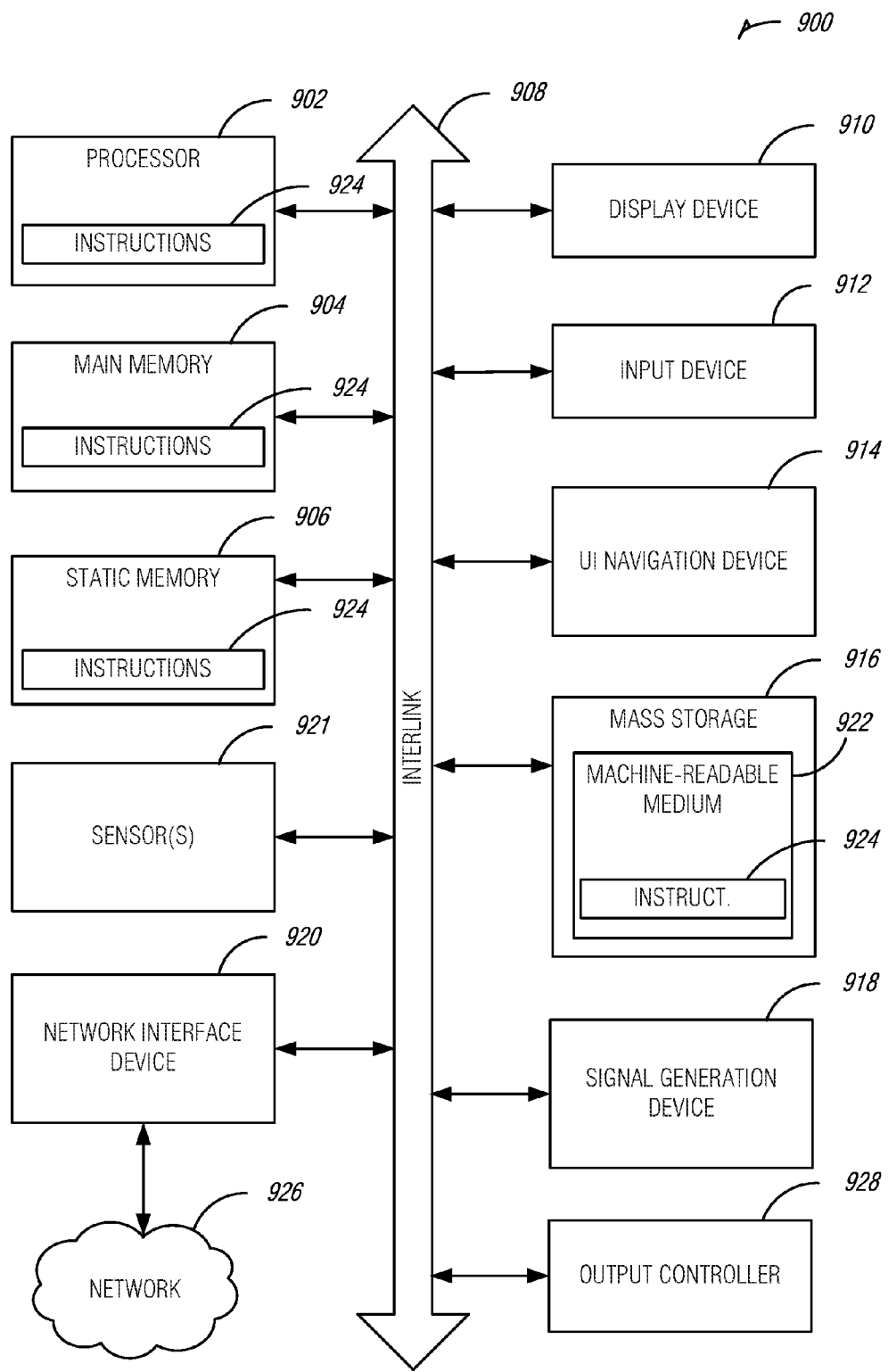
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

What is claimed is:

1. A system for mitigating spectral excursions in a passive optical network (PON), the system comprising:
   at least one processor; and
   a memory including instructions that, when executed by the at least one processor, cause the at least one processor to perform operations to:
      determine a spectral excursion in the PON, wherein the spectral excursion indicates a laser transmission output on the PON at a wavelength that is outside a designated wavelength range;
      identify a duration of the spectral excursion;
      generate a first preamble offset using the duration of the spectral excursion;
      determine a round trip delay for the PON and a local time of day; and
      transmit the first preamble offset, the round trip delay, and the local time of day to an optical line terminal (OLT).

2. The system of claim 1, further comprising instructions that cause the at least one processor to perform operations to:
   determine a ranging window using the preamble offset; and
   transmit the ranging window to the OLT.

3. The system of claim 1, further comprising instructions that cause the at least one processor to perform operations to:
   generate a second preamble offset, wherein the second preamble offset is shorter in length than the first preamble offset;
   create a preamble configuration using the first preamble offset and the second preamble offset, wherein the preamble configuration includes instructions to use the first preamble offset during a burst transmission using a laser of the OLT, and wherein the preamble configuration includes instructions to use the second preamble offset during a continuous transmission using the laser the OLT; and
   transmit the preamble configuration to the OLT.

4. The system of claim 3, wherein the preamble configuration includes a channel schedule that includes instructions for scheduling transmissions across multiple wavelengths, each wavelength corresponding to a respective transmission channel.

5. The system of claim 1, wherein the first preamble offset is used to add one or more timeslots to a preamble included in a physical synchronization block.

6. At least one non-transitory machine readable medium including instructions for mitigating spectral excursions in a passive optical network (PON) that, when executed by a machine, cause the machine to perform operations to:
   determine a spectral excursion in the PON, wherein the spectral excursion indicates a laser transmission output on the PON at a wavelength that is outside a designated wavelength range;
   identify a duration of the spectral excursion;
   generate a first preamble offset using the duration of the spectral excursion;
   determine a round trip delay for the PON and a local time of day; and
   transmit the first preamble offset, the round trip delay, and the local time of day to an optical line terminal (OLT).

7. The at least one machine readable medium of claim 6, further comprising instructions that cause the machine to perform operations to:
   determine a ranging window using the preamble offset; and
   transmit the ranging window to the OLT.

8. The at least one machine readable medium of claim 6, further comprising instructions that cause the machine to perform operations to:
   generate a second preamble offset, wherein the second preamble offset is shorter in length than the first preamble offset;
   create a preamble configuration using the first preamble offset and the second preamble offset, wherein the preamble configuration includes instructions to use the first preamble offset during a burst transmission using a laser of the OLT, and wherein the preamble configuration includes instructions to use the second preamble offset during a continuous transmission using the laser the OLT; and
   transmit the preamble configuration to the OLT.

9. The at least one machine readable medium of claim 8, wherein the preamble configuration includes a channel schedule that includes instructions for scheduling transmissions across multiple wavelengths, each wavelength corresponding to a respective transmission channel.

10. The at least one machine readable medium of claim 6, wherein the first preamble offset increases the length of a preamble included in a physical synchronization block.

11. A method for mitigating spectral excursions in a passive optical network (PON), the method comprising:
    determining a spectral excursion in the PON, wherein the spectral excursion indicates a laser transmission output on the PON at a wavelength that is outside a designated wavelength range;
    identifying a duration of the spectral excursion;
    generating a first preamble offset using the duration of the spectral excursion;
    determining a round trip delay for the PON and a local time of day; and
    transmitting the first preamble offset, the round trip delay, and the local time of day to an optical line terminal (OLT).

12. The method of claim 11, further comprising:
    determining a ranging window using the preamble offset; and
    transmitting the ranging window to an optical network terminal (OLT).

13. The method of claim 11, further comprising:
    generating a second preamble offset, wherein the second preamble offset is shorter in length than the first preamble offset;
    creating a preamble configuration using the first preamble offset and the second preamble offset, wherein the preamble configuration includes using the first preamble offset during a burst transmission using a laser of the OLT, and wherein the preamble configuration includes using the second preamble offset during a continuous transmission using the laser the OLT; and transmitting the preamble configuration to the OLT.

14. The method of claim 13, wherein the preamble configuration includes a channel schedule including instructions for scheduling transmissions across multiple wavelengths, each wavelength corresponding to a respective transmission channel.

15. The method of claim 11, wherein the first preamble offset is used to add one or more timeslots to a preamble included in a physical synchronization block.

16. An optical line terminal (OLT) for mitigating spectral excursions in a passive optical network (PON), the OLT comprising:
   at least one processor;
   at least one transceiver; and
   a memory including instructions that, when executed by the at least one processor, cause the at least one processor to perform operations to:
      determine a spectral excursion in the PON, wherein the spectral excursion indicates a laser transmission output on the PON at a wavelength that is outside a designated wavelength range;
      identify a duration of the spectral excursion;
      generate a first preamble offset using the duration of the spectral excursion;
      determine a round trip delay for the PON and a local time of day; and
      transmit the first preamble offset, the round trip delay, and the local time of day to at least one other OLT.

17. The optical line terminal of claim 16, further comprising instructions that cause the at least one processor to perform operations to:
   determine a ranging window using the preamble; and
   transmit the ranging window to the at least one other OLT.

18. The optical line terminal of claim 16, further comprising instructions that cause the at least one processor to perform operations to:
   generate a second preamble offset, wherein the second preamble offset is shorter in length than the first preamble offset;
   create a preamble configuration using the first preamble offset and the second preamble offset, wherein the preamble configuration includes instructions to use the first preamble offset during a burst transmission using a laser of the at least one other OLT, and wherein the preamble configuration includes instructions to use the second preamble offset during a continuous transmission using the laser the at least one other OLT; and
   transmit the preamble configuration to the at least one other OLT.

19. The optical line terminal of claim 18, wherein the preamble configuration includes a channel schedule that includes instructions for scheduling transmissions across multiple wavelengths, each wavelength corresponding to a respective transmission channel.

20. The optical line terminal of claim 16, wherein the first preamble offset is used to add one or more timeslots to a preamble included in a physical synchronization block.

21. An optical line terminal (OLT) for mitigating spectral excursions in a passive optical network (PON), the OLT comprising:
   at least one processor;
   at least one transceiver;
   at least one laser; and
   a memory including instructions that, when executed by the at least one processor, cause the at least one processor to perform operations to:
      receive a first preamble offset, a round trip delay, and a local time of day from another optical line terminal (OLT);
      synchronize an OLT time value with the local time of day;
      update a stored round trip delay value to match the received round trip delay; and
      modify a current preamble length using the received first preamble offset.

22. The OLT of claim 21, further comprising instructions that cause the at least one processor to perform operations to:
   receive a ranging window from the other OLT; and
   update a current ranging window value to match the received ranging window.

23. The OLT of claim 21, further comprising instructions that cause the at least one processor to perform operations to:
   receive a second preamble offset and a preamble configuration from the other OLT, wherein the second preamble offset is shorter in length than the first preamble offset, and wherein the preamble configuration includes instructions to use the first preamble offset during a burst transmission using the at least one laser, and wherein the preamble configuration includes instructions to use the second preamble offset during a continuous transmission using the at least one laser;
   transmit a plurality of data packets using the at least one laser and the preamble configuration.

24. The OLT of claim 23, wherein the preamble configuration includes a channel schedule that includes instructions for scheduling transmissions across multiple wavelengths, each wavelength corresponding to a respective transmission channel.

25. The OLT of claim 23, further comprising instruction that cause the at least one processor to perform operations to:
   transmit data packets on a first wavelength during a first time period and data packets on a second wavelength during a second time period.

26. The OLT of claim 21, wherein the first preamble offset is used to add one or more timeslots to a preamble included in a physical synchronization block.

* * * * *